2,863,878

SYNTHESIS OF α-α-DIMETHYL-β-HYDROXY-PROPIONALDEHYDE AND α-HYDROXY-β-β-DIMETHYL-γ-BUTYROLACTONE

John W. Lynn, South Charleston, W. Va., assignor to Union Carbide Corporation, a corporation of New York No Drawing. Application May 27, 1954
Serial No. 432,940

6 Claims. (Cl. 260—343.6)

This invention relates in general to the synthesis of aldehydes and their derivatives, and more particularly relates to the preparation of alpha,alpha-dimethyl-beta-hydroxypropionaldehyde and two of its derivatives, alpha,gamma-dihydroxy-beta,beta-dimethyl-butyronitrile and alpha-hydroxy-beta,beta-dimethyl-gamma-butyrolactone.

Alpha-hydroxy-beta,beta-dimethyl-gamma-butyrolactone is an important intermediate in the preparation of pantothenic acid, a vitamin of the B complex, and derivatives thereof. In the synthesis of pantothenic acid, alpha-hydroxy-beta,beta-dimethyl-gamma-butyrolactone (pantolactone) or the corresponding acid is condensed with beta-alanine or a salt or ester of beta-alanine. Alpha,alpha-dimethyl-beta-hydroxypropionaldehyde (formisobutyraldol) and its corresponding cyanohydrin are two intermediates in the synthesis of pantolactone and the corresponding acid.

It is known in the art that alpha,alpha-dimethyl-beta-hydroxypropionaldehyde can be prepared by condensing isobutyraldehyde with formaldehyde. It is also known that the aldehyde, when refined by extraction or other suitable means, can be converted to the corresponding cyanohydrin, alpha-alpha-dihydroxy-beta,beta-dimethyl-butyronitrile. It is further known that the cyanohydrin can be converted to the corresponding lactone by hydrolysis. Processes have been described which combine these steps to produce alpha-hydroxy-beta,beta-dimethyl-gamma-butyrolactone. However, the processes which utilize this general method are not completely satisfactory from a commercial viewpoint. The known processes for the production of the lactone require the use of stoichiometric amounts of condensing agents, such as sodium cyanide, potassium carbonate and sodium bisulfite, or the use of salts, such as calcium chloride, during at least one step in the overall process. These materials must be neutralized prior to the hydrolysis step and the resulting salts must be removed from the system. In addition, these processes require intermediate refining operations which are costly and time consuming.

By operating in accordance with my teachings, the above mentioned disadvantages of the prior art processes are either completely eliminated or greatly reduced. In my overall process, two of the steps require greatly reduced amounts of agents other than the actual reactants, the salt disposal problem is essentially eliminated, and operating costs are significantly decreased. In addition, operation in accordance with the teachings of my invention provides an outstanding improvement over the existing processes, in that it requires no intermediate purification steps.

I have discovered a method by which isobutyraldehyde can be condensed with formaldehyde to produce formisobutyraldol in a state which is suitable for subsequent conversion to the corresponding cyanohydrin without the necessity for any intermediate refining operations. My process comprises reacting formaldehyde with at least an equimolar amount, and preferably an excess, of isobutyraldehyde, in alcoholic solution, e. g. methanolic solution, in the presence of a catalytic quantity i. e. from about 0.5 to about 5.0 percent by weight (based on the total amount of reactants present), of a basic catalyst, such as an alkali metal hydroxide, cyanide or carbonate, an organic amine, such as triethylamine, or a quaternary ammonium hydroxide, such as trimethyl benzyl ammonium hydroxide. My preferred catalyst is sodium hydroxide. The reaction should be conducted at a temperature of from about 0° C. to about 30° C., and preferably from about 10° C. to about 15° C., for from about 0.5 hour to about 10 hours, and preferably about 2 hours. After completion of the reaction, the basic catalyst is neutralized with an organic acid, such as acetic acid, and excess isobutyraldehyde and alcohol are stripped out. The resulting mixture may then be used, without any intermediate purification or refining operations, as a source of alpha,alpha-dimethyl-beta-hydroxypropionaldehyde for the production of alpha, gamma-dihydroxy-beta,beta-dimethylbutyronitrile.

This method of conducting the above condensation reaction is an improvement over the prior art in two ways: (1) it requires much smaller amounts of condensing agent and much smaller amounts of neutralizing agent, thus effecting considerable economy of operations and saving in time, and (2) it eliminates the former requirement of expensive and time-consuming refining operations to produce a product which is suitable for subsequent conversion to the corresponding cyanohydrin.

I have also discovered a process by which alpha,alpha-dimethyl-beta-hydroxypropionaldehyde can be converted to alpha,gamma-dihydroxy-beta,beta-dimethyl-butyronitrile in a state which is suitable for subsequent conversion to the corresponding lactone without the necessity for any intermediate refining operations. The process of my invention comprises reacting alpha,alpha-dimethyl-beta-hydroxypropionaldehyde, which may be in pure form or in the crude form produced by the above-disclosed method, with at least an equimolar amount of hydrogen cyanide in alcoholic solution, e. g. methanolic solution, in the presence of a catalytic quantity, i. e. from about 0.5 to about 5.0 percent by weight (based on the total amount of reactants present) of a basic catalyst, such as an alkali metal hydroxide, cyanide or carbonate, an organic amine, such as triethylamine, or a quaternary ammonium salt, such as trimethyl benzyl ammonium hydroxide. My preferred catalyst is sodium hydroxide. The reaction should be conducted at a temperature of from about 0° C. to about 30° C., and preferably from about 5° C. to about 15° C., for from about 0.5 hour to about 4 hours, and preferably about 2 hours. After completion of the reaction, the basic catalyst is neutralized, for example with dilute hydrochloric acid, sulfuric acid or acetic acid, and methanol and excess hydrogen cyanide are stripped out. The resulting crude cyanohydrin may be used directly in a subsequent process for its conversion to pantolactone. Thus, this method of converting formisobutyraldol to its corresponding cyanohydrin is an improvement over the prior art in the same two respects as my method of operating the aldehyde condensation reaction improves over the corresponding art.

I have further discovered an overall process for the production of pantolactone which is simpler and more economical than the existing processes by virtue of the fact that it requires no intermediate purification operations and that it requires only catalytic quantities of agents other than the actual reactants.

My improved overall process comprises reacting formaldehyde with at least an equimolar amount, and preferably an excess, of isobutyraldehyde, in alcoholic solution, e. g. methanolic solution, in the presence of a catalytic quantity, i. e. from about 0.5 to about 5.0 percent by weight (based on the total amount of reactants present), of a basic catalyst, such as an alkali metal hydroxide, cyanide, or carbonate, an organic amine, such as triethylamine, or a quaternary ammonium hydroxide, such as trimethyl benzyl ammonium hydroxide. The reaction should be conducted at a temperature of from about 0°C. to about 30°C., and preferably from about 10°C. to about 15°C., for from about 0.5 hour to about 10 hours, and preferably about 2 hours. After completion of the reaction, the basic catalyst is neutralized with an organic acid, such as acetic acid, and excess isobutyraldehyde and alcohol are stripped out. The resulting mixture is then reacted with at least an equimolar amount (based on the formisobutyraldol) of hydrogen cyanide in alcoholic solution, e. g. methanolic solution, in the presence of a catalytic quantity, i. e. from about 0.5 to about 5.0 percent by weight (based on the total amount of reactants present) of a basic catalyst, such as an alkali metal hydroxide, cyanide, or carbonate, an organic amine, such as triethylamine, or a quaternary ammonium hydroxide, such as trimethyl benzyl ammonium hydroxide. The reaction should be conducted at a temperature of from about 0° C. to about 30°C., and preferably from about 5°C. to about 15°C., for from about 0.5 hour to about 4 hours, and preferably about 2 hours. After completion of the reaction, the basic catalyst is neutralized, for example with dilute hydrochloric acid, sulfuric acid or acetic acid, and methanol and excess hydrogen cyanide are stripped out. The resulting mixture is then contacted with from about 2 to about 3 mols of hydrochloric acid. Preferably, this step is conducted by first adding concentrated hydrochloric acid and heating for from about 2 hours to about 10 hours at about 80°C., then adding an equal volume of water (based on the acid added) and heating for an additional period of from about 5 hours to 20 hours at about 100° C. This method is preferred so that advantage may be taken of the fact that nitriles hydrolyze rapidly to amides in concentrated acids while amides hydrolyze rapidly to carboxylic acids in dilute solution. The resulting lactone is then recovered by suitable means. For example, the mixture may be subjected to extraction with a solvent, such as diethyl ether, ethylene dichloride or chloroform, the extract phase stripped to remove the solvent and the extract distilled to yield essentially pure pantolactone in good yields.

The following examples are given to illustrate my invention.

Example I

A mixture of 288 g. (4 mols) of isobutyraldehyde, 288 g. of methanol was cooled to 10°C. and 170 g. (2 mols) of 36.6% formalin containing 8.5 g. (3% based on isobutyraldehyde) of sodium hydroxide was added dropwise over a 55 minute period to produce alpha,alpha-dimethyl-beta-hydroxy-propionaldehyde. The mixture was stirred for an additional 2 hours at 10–15°C. and then contacted with acetic acid to neutralize the catalyst. The excess isobutyraldehyde and methanol were stripped off at a kettle temperature of 50°C. at 25 mm. To the residual alpha,alpha-dimethyl-beta - hydroxypropionaldehyde a mixture of 260 ml. of methanol and 2 g. (0.75%) sodium cyanide was added and the solution cooled to 10°C. before adding 59.4 g. (2.2 mols) of hydrogen cyanide dropwise over a 35 minute period to produce alpha, gamma-dihydroxy - beta,beta-dimethylbutyronitrile. The mixture was stirred at 10°C. for one hour period and then contacted with acetic acid to neutralize the catalyst before stripping off the excess methanol to a kettle temperature of 45° C. at 18 mm. The crude cyanohydrin was then hydrolysed by heating with 4 mols of concentrated hydrochloric acid at 80°C. for 2 hours, then diluting with an equal volume of water and heating at 100°C. for an additional 8 hours. The aqueous mixture was extracted continuously with ethylene dichloride. The solvent was removed, and pantolactone (B. P. 131°/19 mm., M. P. 61–77°C., 96.5% purity by saponification) was obtained by distillation in 71.5% yield based on formaldehyde and 55% efficiency based on isobutyraldehyde.

Example II

A mixture of 204 g. (2 mols) alpha,alpha-dimethyl-beta-hydroxypropionaldehyde, 260 g. methanol and 2 g. (2%) sodium hydroxide was cooled to 10°C. and 59.4 g. (2.2 mols) of hydrogen cyanide was added dropwise during stirring over a 25 minute period to produce alpha, gamma-dihydroxy - beta,beta-dimethylbutyronitrile. The temperature was maintained at 10°C. for an additional 2 hour period before acidifying the mixture with dilute hydrochloric acid. The excess hydrogen cyanide and methanol were removed by stripping to a kettle temperature of 50°C. at 25 mm. To the residual cyanohydrin there was added 4 mols of concentrated hydrochloric acid and this mixture stirred at 70–75°C. for 2 hours. An equal volume of water was then added and the mixture stirred at 105°C. for an 8 hour period. The dark mixture was then extracted continuously with ethylene dichloride. After stripping the solvent the product, pantolactone (109–121°/20–30 mm., M. P. 69–76° C., 95% purity by saponification), was obtained by distillation in 62% yield.

Example III

A mixture of 202 g. (2 mols) of alpha,alpha-dimethyl-beta-hydroxypropionaldehyde, 260 ml. of methanol and 2 g. (2%) triethylamine were cooled to 10°C. and 59.4 g. (2.2 mols) of hydrogen cyanide was added dropwise during stirring over a 45 minute period to produce alpha, gamma-dihydroxy-beta,beta - dimethylbutyronitrile. The temperature was maintained at 10°C. for an additional 2 hours before acidifying with dilute hydrochloric acid. The excess hydrogen cyanide and methanol were removed by stripping to a kettle temperature of 50°C. at 25 mm. Concentrated hydrochloric acid (4 mols) was then added and the mixture stirred for 2 hours at 70–75°C. An equal volume of water was then added and the mixture stirred at 101°C. for an 8 hour period. After extracting the mixture continuously with ethylene dichloride the solvent was removed and the product distilled through a short column. Pantolactone (B. P. 118–127°/16 mm., M. P. 79–82° C., 95–98% purity by saponification, analyses: calc'd C, 55.3%, H, 7.7%; found C, 55.2%, H, 8.1%) was obtained in 78% yield.

I claim:

1. A process for producing alpha,alpha-dimethyl-beta-hydroxypropionaldehyde comprising reacting isobutyraldehyde with formaldehyde at a temperature of from about 0° C. to about 30° C. in the presence of from about 0.5 to about 5.0 percent by weight of a basic catalyst.

2. A process for producing alpha,alpha-dimethyl-beta-hydroxypropionaldehyde comprising reacting isobutyraldehyde with formaldehyde at a temperature of from about 0° C. to about 30° C. in the presence of from about 0.5 to about 5.0 percent by weight of an alkali metal hydroxide.

3. A process for producing alpha,alpha-dimethyl-beta-hydroxypropionaldehyde comprising reacting an excess of isobutyraldehyde with formaldehyde at a temperature of from about 0° C. to about 30° C. in the presence of from about 0.5 to about 5.0 percent by weight of a basic catalyst.

4. A process for producing alpha,alpha-dimethyl-beta-hydroxypropionaldehyde comprising reacting an excess of isobutyraldehyde with formaldehyde at a temperature of from about 0° C. to about 30° C. in the presence of from about 0.5 to about 5.0 percent by weight of an alkali metal hydroxide.

5. A process for producing alpha-hydroxy-beta-dimethyl-gamma-butyrolactone comprising reacting isobutyraldehyde with formaldehyde at a temperature of from about 0° C. to about 30° C. in the presence of from about 0.5 to about 5.0 percent by weight of a basic catalyst to produce alpha, alpha-dimethyl-beta-hydroxypropionaldehyde, neutralizing the basic catalyst, reacting hydrogen cyanide at a temperature of from about 0° C. to about 30° C. with the resulting mixture in the presence of from about 0.5 to about 5.0 percent by weight of a basic catalyst to produce alpha,gamma-dihydroxy-beta-dimethylbutyonitrile, neutralizing the basic catalyst, reacting the resulting mixture with aqueous hydrochloric acid to produce alpha - hydroxy-beta,beta-dimethyl-gamma-butyrolactone, and recovering said lactone from the reaction mixture.

6. A process for producing alpha-hydroxy-beta-dimethyl-gamma-butyrolactone comprising reacting isobutyraldehyde with formaldehyde at a temperature of from about 0° C. to about 30° C. in the presence of from about 0.5 to about 5.0 percent by weight of a basic catalyst to produce alpha,alpha-dimethyl-beta-hydroxypropionaldehyde, neutralizing the basic catalyst with a lower monocarboxylic acid, reacting hydrogen cyanide at a temperature of from about 0° C. to about 30° C. with the resulting mixture in the presence of from about 0.5 to about 5.0 percent by weight of a basic catalyst to produce alpha,gamma-dihydroxy-beta-dimethylbutyronitrile, neutralizing the basic catalyst, reacting the resulting mixture with aqueous hydrochloric acid to produce alpha-hydroxy - beta,beta - dimethyl-gamma-butyrolactone, and recovering said lactone from the reaction mixture.

References Cited in the file of this patent

UNITED STATES PATENTS

| | | |
|---|---|---|
| 2,101,823 | Dittman | Dec. 7, 1937 |
| 2,271,872 | Mitchell | Feb. 3, 1942 |
| 2,328,000 | Finkelstein | Aug. 31, 1943 |
| 2,399,362 | Lawson et al. | Apr. 30, 1946 |
| 2,443,334 | Van House | June 15, 1948 |
| 2,462,449 | Williams | Feb. 22, 1949 |

FOREIGN PATENTS

| | | |
|---|---|---|
| 359,262 | Great Britain | Oct. 22, 1931 |

OTHER REFERENCES

Wessely: Monatsh. für Chemie, vol. 21, pages 216–220 (1900).

Beer et al.: Chem. Abst., vol. 42, page 2579 (1948), citing Vitamin Research News (U. S. S. R.), 1946, No. 1, pp. 43–7.

Stiller et al.: J. A. C. S. 62, 1785–90 (1940).

Glaser: Monatsh. für chem. 25, pages 46–54 (1904).

Lieben: Monatsh. für chem. 22, 289–311 (1902).